United States Patent [19]

Iranzadi

[11] Patent Number: 4,729,297

[45] Date of Patent: Mar. 8, 1988

[54] COOKING GRILL

[76] Inventor: Morad Iranzadi, 10500 Rockville Pike No. 1509, Rockville, Md. 20852

[21] Appl. No.: 928,002

[22] Filed: Nov. 7, 1986

[51] Int. Cl.⁴ .............................................. A47J 27/00
[52] U.S. Cl. ....................................... 99/401; 99/339; 99/425; 99/447
[58] Field of Search ................. 99/447, 448, 449, 446, 99/339, 401, 421 R, 422, 425, 415

[56] References Cited

U.S. PATENT DOCUMENTS

| | | |
|---|---|---|
| 1,622,587 | 3/1927 | Housel . |
| 2,374,749 | 5/1945 | Howard ............................ 126/215 |
| 2,605,382 | 7/1952 | Kircher et al. ..................... 219/43 |
| 3,212,426 | 10/1955 | Lewus ................................. 99/339 |
| 3,217,634 | 11/1965 | Fox ..................................... 99/339 |
| 3,283,696 | 11/1966 | Randolph ............................ 99/425 |
| 3,296,957 | 1/1967 | Gagnon et al. ..................... 99/444 |
| 3,301,172 | 1/1967 | Haro ................................... 99/446 |
| 3,427,957 | 2/1969 | O'Reilly . | 
| 3,799,048 | 3/1974 | Finley ................................. 99/415 |
| 4,006,676 | 2/1977 | Adamis ............................... 99/422 |

OTHER PUBLICATIONS

Industrias AL-GON S. A. Grill-Gas Pamphlet.

Primary Examiner—Louis K. Rimrodt
Assistant Examiner—Judith L. Olds
Attorney, Agent, or Firm—Wegner & Bretschneider

[57] ABSTRACT

Improvements are disclosed for a cooking device having a base with an opening in the center which is placed over the burner of a stove, a wire grid supported over the base and spaced therefrom which supports food to be cooked, and a lid which rests on the base over the wire grid. One improvement is a frusto-conically shaped support which supports the cooking device over the burner and which has holes in the side thereof to allow the device to be used with an electric stove. Another improvement is a removable plate which is interposed between the base and the wire grid which catches drippings from the food, and thus prevents unwanted odors and smoke.

8 Claims, 6 Drawing Figures

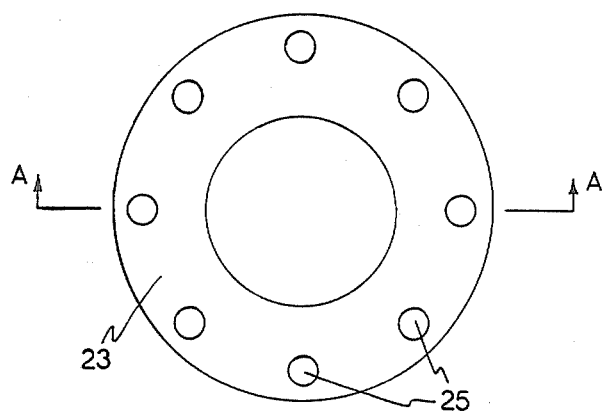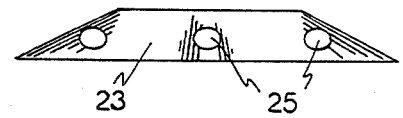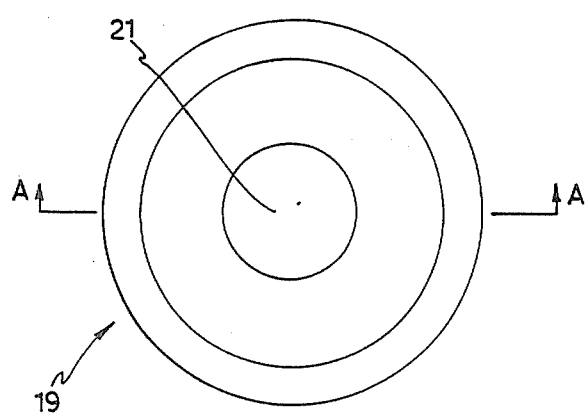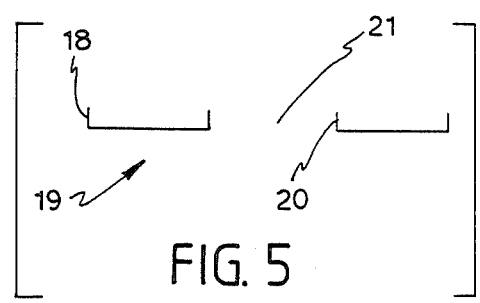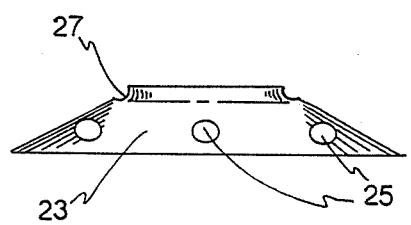

COOKING GRILL

BACKGROUND OF THE INVENTION

The invention relates to a cooking grill, and more specifically to improvements to a cooking device which allows food to be grilled on the surface of a stove.

A known device which is suitable for use with the present invention is disclosed in U.S. Pat. No. 3,301,172 (which is hereby incorporated by reference in its entirety). This cooking grill comprises a circular base with a hole in the center, a wire grid supported above the base and spaced therefrom, and a removable cover placed over the wire grid. The device is placed on the surface of a stove with the circular hole placed over the flame of a burner, and food to be cooked is placed on the wire grid.

This known device has a number of disadvantages. Namely, as food is being cooked, grease and fats from the food drip down onto the base. This base rests directly on the surface of the stove, and therefore has a tendency to be heated to a high temperature and is unstable resting on the burners of a gas stove. Thus, the drippings will evaporate from the base, creating excessive smoke and odors, which are undesirable in a device being used indoors.

Furthermore, the device described above is not suitable for use with an electric stove. In order to properly cook the food in this device, convection type heating is required which surrounds the food with cooking heat. However, a cooking element of an electric stove gives off mainly radiant heat, which will not cook the food as evenly or efficiently.

OBJECTS OF THE INVENTION

It is an object of the invention to provide improvements to the above-described device which prevent excessive smoking and undesirable odors during cooking.

It is a further object to provide improvements which allow the above device to be used in conjunction with an electric stove.

A still further object is to make the above improvements easily applicable to a pre-existing device.

SUMMARY OF THE INVENTION

These and other objects of the invention are achieved by a device as described above, further comprising a removable plate which fits inside the base, and a frusto-conical support which supports the device over an electric stove element.

The removable plate is preferably of the same general shape as the base. The plate rests within the base, but spaced apart therefrom. Thus, although the base gets hot during cooking, the additional plate, because it is not resting directly on the base, remains cool. It is especialy advantageous if the plate is plate is made of metal, with at least the upper surface having a porcelain coating, which makes the plate easier to clean after cooking. It is additionally desirable to have the metal plate be of such a thickness to prevent warping of the plate during exposure to the high cooking temperatures.

The support is preferably of frusto-conical shape, with the wider opening being designed to be placed over an element of an electric stove. The cooking device rests over the narrower opening, with the hole in the base aligned with said opening. The support has a plurality of holes in the sloping side walls, which aid in the creation of convection currents within the support and the cooking device.

BRIEF DESCRIPTION OF THE DRAWINGS

FIG. 2 is a plan view of the support device of the invention;

FIG. 3 is a cross-sectional view taken along line A—A of FIG. 2;

FIG. 4 is a plan view of the removable plate of the invention;

FIG. 5 is a cross-sectional view taken along line A—A of FIG. 3; and

FIG. 6 is a plan view of the support device of a preferred embodiment.

DESCRIPTION OF THE INVENTION

Figure 1:
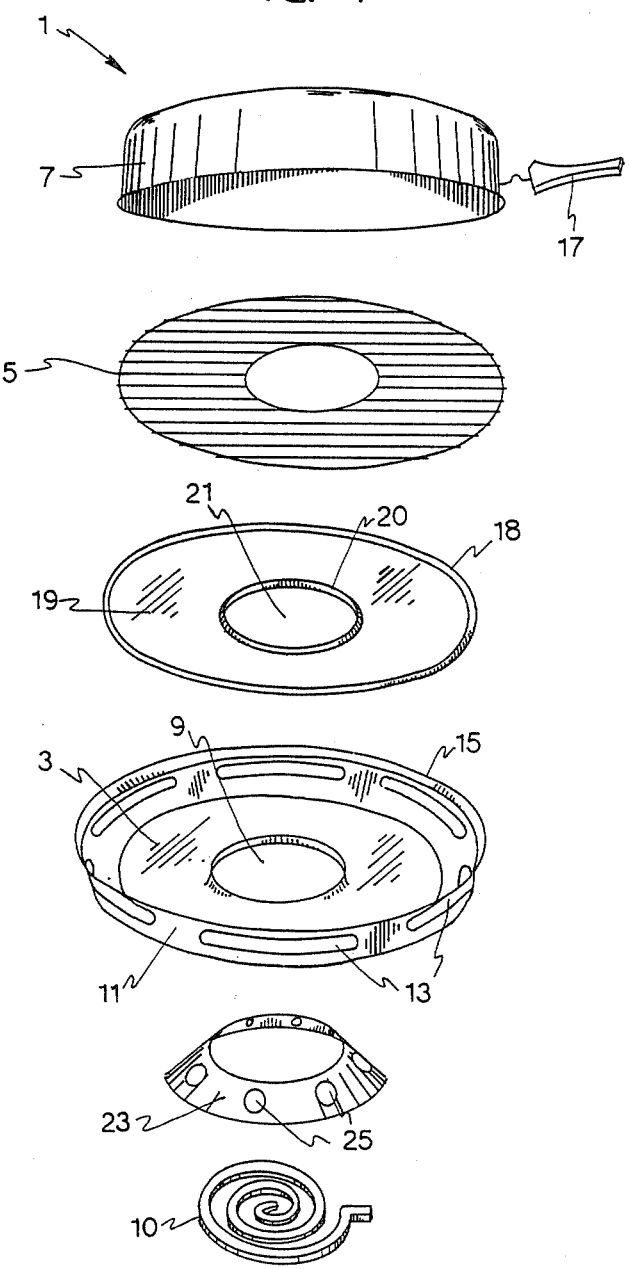
FIG. 1 is an exploded perspective view of the cooking device of the invention.

Referring to FIG. 1, there is shown a cooking device 1 having a base 3, a wire grid 5, and a lid 7. The bottom of the base 3 is preferably circular in shape, and has a circular hole 9 in the center thereof. During cooking, the hole 9 is centered over the burner 10 of a stove. Because of the close proximity of the base 3 to the burner 10, the bottom of the base becomes very hot during cooking. The base also has a side wall 11 with a plurality of vents 13 therein. The wire grid 5 preferably rests on an a flange 15 located around the top of the side wall 11. Food to be cooked (not shown) is placed on the wire grid 5. The lid 7 also preferably rests on the flange 15 of the side wall, and has a handle 17 to facilitate removal of the lid during cooking. Grill type cooking is accomplished as convection heat passes up through the hole 9 and through the wire grid 5, deflects off the lid 7, and exits through the vents 13.

The cooking device 1 also has a removable plate 19 which collects drippings food from the food being cooked. The removable plate 19 is of the same shape as the base, and has a hole 21 in the center thereof which is preferably of approximately the same size as the hole 9. The plate 19 rests against the side wall below the vents 13 and between the wire grid and the bottom of the base and is spaced apart therefrom. The distance between the plate and the bottom of the base is approximately one-quarter of an inch. The plate 19, being spaced apart from the bottom of the base, stays cool during cooking. Thus, drippings which collect on the removable plate 19 during cooking remain cool, and do not evaporate, to cause unwanted smoke and odors. The plate 19 of the preferred embodiment has upwardly-pointing flanges 18 and 20 around the outer and inner edges of the plate which help retain the drippings. The plate 19 is preferably made of metal with a porcelain coating which makes the plate easier to clean.

The cooking device of the invention also has a support 23 which allows the device to be used in conjunction with an electric stove. The support 23 is preferably frusto-conical in shape, with the wider opening being placed over the burner 10. The upper rim of the support 23 supports the base 3, with the narrower opening being aligned with the hole 9. The support 23 has a plurality of openings 25 in the side wall thereof. The openings 25 aid in the production of convection currents to carry heat from the burner 10 up into the cooking device. Thus, an electric cooking element, which normally does not produce enough convection heat to be useful with a device such as this, can be used in conjunction with the support 25 to produce convection heating.

In the preferred embodiment shown in FIG. 6, the support 23 has an inwardly-directed flange 27 which provides better support for the base 3 on the support. The upper opening is preferably of about the same size as the hole 9.

Many modifications of the present invention are possible in light of the above teaching. The wire grid, for example, could be supported by uprights within the base, instead of by the side wall of the base. The shapes and dimensions of the various parts can be modified, without departing from the spirit and scope of the invention. Although a detailed description has been provided above, the present invention is not limited thereto, but rather is defined by the following claims.

What is claimed is:

1. A device for cooking food, comprising:
   a base comprising a bottom wall and at least one side wall, said bottom wall having an opening in the center thereof;
   a wire grid for supporting food which rests on said base and is spaced apart therefrom;
   a removable lid comprising a top wall and at least one side wall, said lid being capable of resting on said base and being spaced apart therefrom; and
   a support means which is essentially frusto-conically shaped and has a bottom rim, a top rim and a side wall, said bottom rim being capable of resting on a stove over a burner, the top rim being capable of supporting the base thereon, and the side wall of said support means having a plurality of openings therein which promote the formation of convection currents which help carry heat from the burner to the food on the wire grid.

2. A cooking device as claimed in claim 1, wherein the side wall of said base has at least one opening therein which allows heat from the burner to exit the cooking device.

3. A cooking device as claimed in claim 1, wherein said upper rim has a flange attached thereto which supports of the base.

4. A device as claimed in claim 1, further comprising a removable plate interposed between said base and said wire grid, said plate resting within said base and spaced apart from the bottom wall thereof, and having an opening in the center thereof which is essentially the same size and shape of the opening in the bottom wall of the base.

5. A device for cooking food, comprising:
   a base comprising a bottom wall and at least one side wall, said bottom wall having an opening in the center thereof;
   a wire grid for supporting food which rests on said base and is spaced apart therefrom;
   a removable lid comprising a top wall and at least one side wall, said lid being capable of resting on said base and being spaced apart therefrom; and
   a removable plate interposed between said base and said wire grid, said plate resting within said base and spaced apart from the bottom wall thereof, and having an opening in the center thereof which is essentially the same size and shape of the opening in the bottom wall of the base.

6. A cooking device as claimed in claim 5, wherein the side wall of said base has at least one opening therein which allows heat from the burner to exit the cooking device.

7. A cooking device as claimed in claim 5, wherein said removable plate is made of metal with a porcelain coating.

8. A cooking device as claimed in claim 5, wherein said removable plate has an outer edge, and further comprises a first upwardly-directed flange attached to said outer edge and a second upwardly-directed flange around the opening in said removable plate.

* * * * *